United States Patent
Yang et al.

(10) Patent No.: US 10,198,102 B2
(45) Date of Patent: Feb. 5, 2019

(54) TOUCH DISPLAY PANEL AND ITS CONTROLLING METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Chunlei Wang, Beijing (CN); Wei Li, Beijing (CN); Huijie Xie, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 634 days.

(21) Appl. No.: 14/804,909

(22) Filed: Jul. 21, 2015

(65) Prior Publication Data

US 2016/0209942 A1    Jul. 21, 2016

(30) Foreign Application Priority Data

Jan. 15, 2015 (CN) .......................... 2015 1 0021014

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01)

(58) Field of Classification Search
CPC ....... G06F 3/0412; G06F 3/0416; G06F 3/044
(Continued)

(56) References Cited

U.S. PATENT DOCUMENTS

2009/0201267 A1    8/2009 Akimoto et al.
2012/0038567 A1*   2/2012 Kim ...................... G06F 3/045
                                                            345/173
(Continued)

FOREIGN PATENT DOCUMENTS

| CN | 101251780 A | 8/2008 |
| CN | 103135815 A | 6/2013 |
| CN | 104035639 A | 9/2014 |

OTHER PUBLICATIONS

First Office Action regarding Chinese application No. 201510021014.6, dated Dec. 15, 2016. Translation provided by Dragon Intellectual Property Law Firm.

*Primary Examiner* — Nelson Rosario
*Assistant Examiner* — Andrew Lee
(74) *Attorney, Agent, or Firm* — Harness, Dickey & Pierce, P.L.C.

(57) ABSTRACT

The present disclosure provides a touch display panel and its controlling method. The touch display panel includes a plurality of first touch electrodes and a plurality of first touch electrode lines arranged on an array substrate, a plurality of second touch electrodes and a plurality of second touch electrode lines arranged on a color filter substrate, and region scanning electrodes. Each first touch electrode line is connected to each first touch electrode, and each second touch electrode line is connected to each second touch electrode. All the first touch electrodes are located at one half of a display region of the touch display panel, and all the second touch electrodes are located at the other half of the display region of the display panel.

20 Claims, 8 Drawing Sheets

(58) Field of Classification Search
USPC .................................................. 345/170–178
See application file for complete search history.

(56) References Cited

U.S. PATENT DOCUMENTS

| 2014/0184559 | A1  | 7/2014  | Han et al. |               |
|--------------|-----|---------|------------|---------------|
| 2014/0333547 | A1* | 11/2014 | Yi         | G06F 3/0416   |
|              |     |         |            | 345/173       |
| 2015/0077370 | A1* | 3/2015  | Kim        | G06F 3/0416   |
|              |     |         |            | 345/173       |

* cited by examiner

TOUCH DISPLAY PANEL AND ITS CONTROLLING METHOD

CROSS-REFERENCE TO RELATED APPLICATION

The present application claims a priority of the Chinese patent application No. 201510021014.6 filed on Jan. 15, 2015, which is incorporated herein by reference in its entirety.

TECHNICAL FIELD

The present disclosure relates to the field of touch liquid crystal display technology, in particular to a touch display panel and its controlling method.

BACKGROUND

Along with the rapid development of the display technology, the application of a touch panel has made our lives easier. Currently, an in-cell capacitive touch technique has been widely applied in the display field.

The in-cell capacitive touch technique may include an in-cell self-inductance capacitive touch technique and an in-cell mutual-inductance capacitive touch technique. As compared with the in-cell mutual-inductance capacitive touch, the in-cell self-inductance capacitive touch has such advantages as high signal-to-noise ratio and low cost.

Recently, the in-cell self-inductance capacitive touch may be achieved by providing a sensing electrode on an array substrate or a color filter substrate. FIG. 1 shows a situation where touch electrodes 10 are arranged on the array substrate. Because each touch electrode 10 is required to be connected to a touch electrode line 20, a large number of touch electrode lines 20 on the array substrate will occupy a large area of a non-display region, so it is impossible to meet the design requirements of a narrow-bezel product. FIG. 2 shows a situation where the sensing electrode is arranged on the color filter substrate. Identically, a large number of touch electrode lines 20 will occupy a large area of the non-display region. In addition, single-layered metal wiring is adopted, and a space for the touch electrode line 20 needs to be left between the touch electrodes 10, so there may exist touch blind regions.

SUMMARY

An object of the present disclosure is to provide a touch display panel and its controlling method, so as to reduce an area occupied by touch electrode lines and reduce touch blind regions.

In one aspect, the present disclosure provides a touch display panel, including a plurality of first touch electrodes and a plurality of first touch electrode lines arranged on an array substrate, a plurality of second touch electrodes and a plurality of second touch electrode lines arranged on a color filter substrate, and region scanning electrodes. Each first touch electrode line is connected to each first touch electrode, and each second touch electrode line is connected to each second touch electrode. All the first touch electrodes are located at one half of a display region of the touch display panel, and all the second touch electrodes are located at the other half of the display region of the display panel. At a non-display region, at least parts of the first touch electrode lines coincide with at least parts of the second touch electrode lines in a pairwise manner. The region scanning electrodes are configured to determine a region where a touch has been made.

In another aspect, the present disclosure provides in an embodiment a method for controlling the above-mentioned touch display panel, including steps of, at a touch stage, determining a region where a touch has been made by region scanning electrodes of the touch display panel, and applying a driving signal to first touch electrodes or second touch electrodes at the region where the touch has been made so as to determine a position where the touch has been made.

According to the touch display panel and its controlling method in the embodiments of the present disclosure, the touch display panel includes the plurality of first touch electrodes and the plurality of first touch electrode lines arranged on the array substrate, the plurality of second touch electrodes and the plurality of second touch electrode lines arranged on the color filter substrate, and the region scanning electrodes. Each first touch electrode line is connected to each first touch electrode, and each second touch electrode line is connected to each second touch electrode. All the first touch electrodes are located at one half of the display region of the touch display panel, and all the second touch electrodes are located at the other half of the display region of the display panel. At the non-display region, at least parts of the first touch electrode lines coincide with at least parts of the second touch electrode lines in a pairwise manner. The region scanning electrodes are configured to determine the region where the touch has been made.

The first touch electrodes are arranged at one half of the display region of the touch display panel, and the second touch electrodes are arranged at the other half of the display region, so as to enable at least parts of the first electrode lines connected to parts of the first touch electrodes to coincide with at least parts of the second electrode lines connected to parts of the second touch electrodes in a pairwise manner in non-display region, thereby to reduce the number of pads connected to the touch electrode lines as compared with the related art. Further, because the first touch electrode lines may coincide with the second touch electrode lines in a pairwise manner, it is able to reduce an area of the non-display region occupied by the touch electrode lines. In addition, as compared with the related art where all the touch electrodes are arranged on the color filter substrate, merely parts of the touch electrodes, i.e., the second touch electrodes, are arranged on the color filter substrate in the embodiments of the present disclosure, so even if the single-layered metal wiring is adopted for the second touch electrodes and the second touch electrode lines, it is still able to reduce the touch blind regions by half.

BRIEF DESCRIPTION OF THE DRAWINGS

In order to illustrate the technical solutions of the present disclosure or the related art in a more apparent manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

Figure 1:
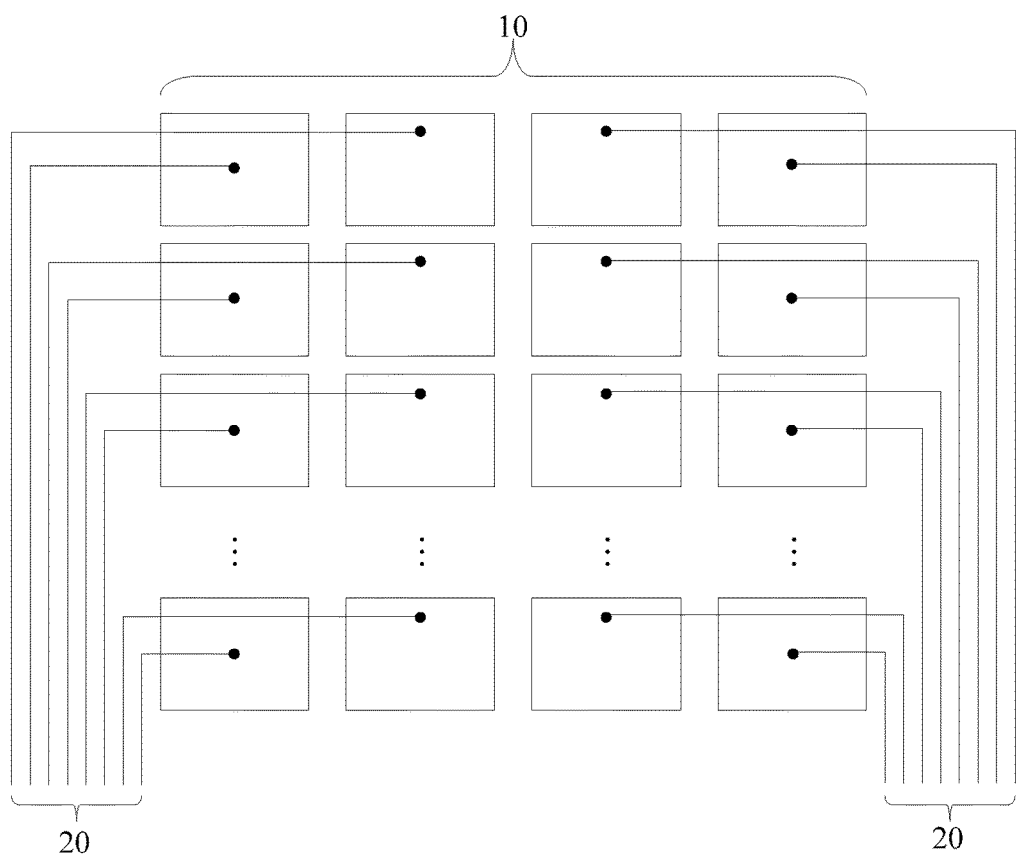
FIG. 1 is a schematic view showing a situation in the related art where touch electrodes are arranged on an array substrate.
Figure 2:
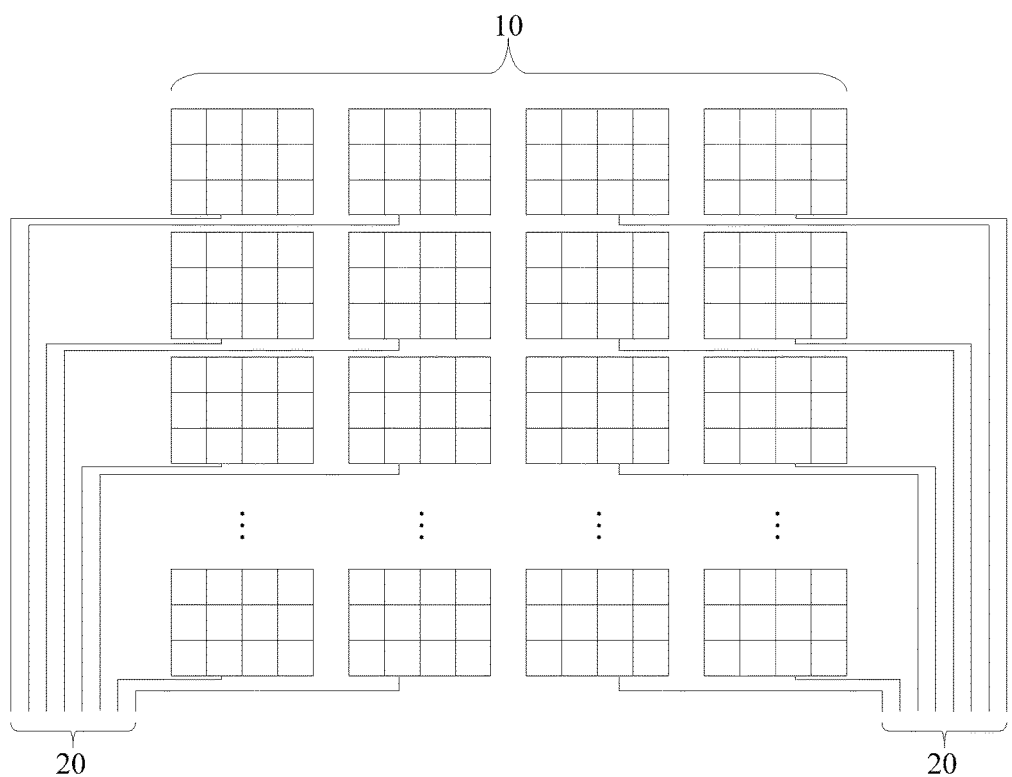
FIG. 2 is a schematic view showing a situation in the related art where the touch electrodes are arranged on a color filter substrate.

The present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may, without any creative effort, obtain the other embodiments, which also fall within the scope of the present disclosure.

The present disclosure provides in an embodiment a touch display panel which, as shown in FIGS. 3-7, include a plurality of first touch electrodes 101 and a plurality of first touch electrode lines 201 arranged on an array substrate, a plurality of second touch electrodes 102 and a plurality of second touch electrode lines 202 arranged on a color filter substrate, and region scanning electrodes. Each first touch electrode line 201 is connected to each first touch electrode 101, and each second touch electrode line 202 is connected to each second touch electrode 102.

All the first touch electrodes 101 are located at one half of a display region of the touch display panel, and all the second touch electrodes 102 are located at the other half of the display region of the touch display panel. At a non-display region, at least parts of the first touch electrode lines 201 coincide with at least parts of the second touch electrode lines 202 in a pairwise manner. The region scanning electrodes are configured to determine a region where a touch has been made.

It should be appreciated that, firstly, the array substrate at least includes Thin Film Transistors (TFTs) and pixel electrodes (not shown). Each TFT includes a gate electrode, a gate insulating layer, an active layer, a source electrode and a drain electrode. The drain electrode is electrically connected to the pixel electrode.

Secondly, in order to adversely affect the display, the first touch electrode 101 on the array substrate is usually made of a transparent material and has a block-like shape.

Thirdly, because each first touch electrode 101 is connected to one first touch electrode line 201, the number of the first touch electrodes 101 is equal to the number of the first touch electrode lines 201. In this regard, the first touch electrode lines 201 mentioned in the embodiments of the present disclosure refer to the plurality of first touch electrode lines 201 connected to the plurality of first touch electrodes 101, respectively, and the second touch electrode lines 202 refer to the plurality of second touch electrode lines 202 connected to the plurality of second touch electrodes 102, respectively.

For example, when there are 50 first touch electrodes, the number of the first touch electrode lines 201 is also 50, and when there are 50 second touch electrodes, the number of the second touch electrode lines 202 is also 50. In this regard, when the number of the at least parts of the first touch electrode lines 201 and the number of the at least parts of the second touch electrode lines 202 are each 20, the 20 first touch electrode lines 201 coincide with the 20 second touch electrode lines 202 in a pairwise manner. Here, the number of the first touch electrodes 101 may different from the number of the second touch electrodes 102.

Fourthly, in order to achieve a touch function, the display panel shall further include a driver integrated circuit (IC) connected to the touch electrode lines. The driver IC is electrically connected to the touch electrode lines via pads on the touch display panel, so as to apply a voltage to each touch electrode.

In the embodiments of the present disclosure, one of the at least parts of the first touch electrode lines 201 coincides with one of the at least parts of the second touch electrode lines 202 at the non-display region in a pairwise manner, so they certainly share one pad. Here, the first touch electrode line 201 and the second touch electrode line 202, which are located at different substrates and coincide with each other, may be electrically connected to each other via a sealant doped with balls.

Fifthly, all the first touch electrodes 101 being located at one half of the display region of the touch display panel means that all the first touch electrodes 101 may be located as a whole at a top half, a bottom half, a left half or a right half of the display region of the touch display panel. In this case, all the second touch electrodes 102 are located as a whole at the remaining half of the display region.

For example, all the first touch electrodes 101 may be located as a whole at the bottom half of the display region of the touch display panel, and all the second touch electrodes 102 may be located as a whole at the top half of the display region of the touch display panel. In this case, when it is determined by the region scanning electrode that the touch has been made at the bottom half of the display region, a touch position may be determined by the touch electrodes at the bottom half of the display region, i.e., the first touch electrodes 101. Identically, when it is determined by the region scanning electrode that the touch has been made at the top half of the display region, the touch position may be determined by the touch electrodes at the top half of the display region, i.e., the second touch electrodes 102.

To be specific, one of the at least parts of the first touch electrode lines 201 coincides with one of the at least parts of the second touch electrode lines 202 at the non-display region, i.e., a voltage is applied by the driver IC via a pad to the first touch electrode line 201 and the second touch electrode line 202 that coincide with each other. When it is determined by the region scanning electrode that the touch has been made at the bottom half of the display region, the voltage is merely applied by the driver IC to the first touch electrode 101 at the bottom half of the display region, so it is able to determine the touch position at the bottom half of the display region.

Similarly, one of the at least parts of the first touch electrode lines 201 coincides with one of the at least parts of the second touch electrode lines 202 at the non-display region, i.e., a voltage is applied by the driver IC via a pad to the first touch electrode line 201 and the second touch electrode line 202 that coincide with each other, when it is determined by the region scanning electrode that the touch has been made at the top half of the display region, the voltage is merely applied by the driver IC to the second touch electrode 102 at the bottom half of the display region, so it is able to determine the touch position at the top half of the display region.

Here, a position of the region scanning electrode is not particularly defined, as long as it may determine the region of the touch display panel where the touch has been made.

The present disclosure provides in an embodiment a touch display pane, including a plurality of first touch electrodes 101 and a plurality of first touch electrode lines 201 arranged on an array substrate, a plurality of second touch electrodes 102 and a plurality of second touch electrode lines 202 arranged on a color filter substrate, and region scanning electrodes. Each first touch electrode line 201 is connected to each first touch electrode 101, and each second touch electrode line 202 is connected to each second touch electrode 102. All the first touch electrodes 101 are located at one half of a display region of the touch display panel, and all the second touch electrodes 201 are located at the other half of the display region of the display panel. At a non-display region, at least parts of the first touch electrode lines 102 coincide with at least parts of the second touch electrode lines 202 in a pairwise manner. The region scanning electrodes are configured to determine a region where a touch has been made.

According to the embodiment of the present disclosure, the first touch electrodes 101 are arranged at one half of the display region of the touch display panel and the second touch electrodes 102 are arranged at the other half of the display region, so that at least parts of the first touch electrode lines 201 connected to at least parts of the first touch electrodes 101 coincide with at least parts of the second touch electrode lines 202 connected to at least parts of the second touch electrodes 102 at the non-display region in a pairwise manner. As a result, it is able to reduce the number of pads connected to the touch electrode lines. In addition, because the first touch electrode lines 201 may coincide with the second touch electrode lines 202 in a pairwise manner, it is able to reduce an area of the non-display region occupied by the touch electrode lines.

Further, as compared with the related art where all the touch electrodes are arranged on the color filter substrate, merely parts of the touch electrodes, i.e., the second touch electrodes 102, are arranged on the color filter substrate in the embodiments of the present disclosure, so even if the single-layered metal wiring is adopted for the second touch electrodes 102 and the second touch electrode lines 202, it is still able to reduce the touch blind regions by half.

Figure 3:
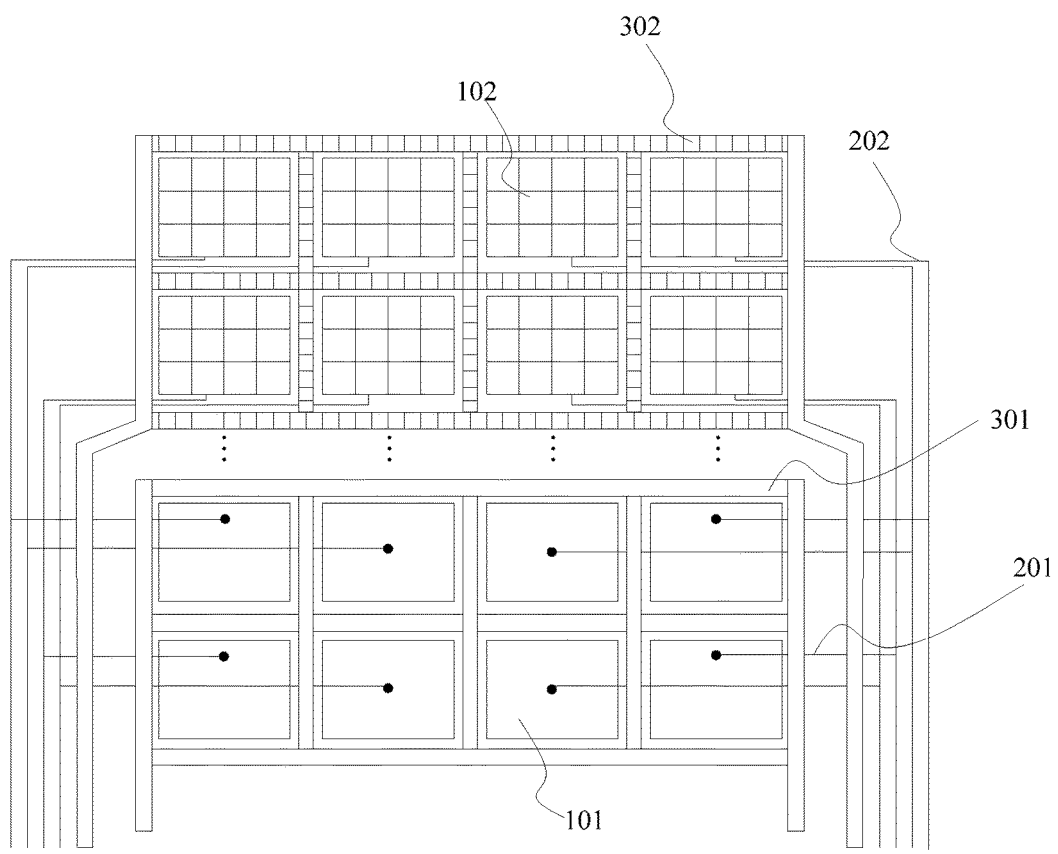
FIG. 3 is a schematic view showing the distribution of touch electrodes in a touch display panel according to an embodiment of the present disclosure.
Figure 4:
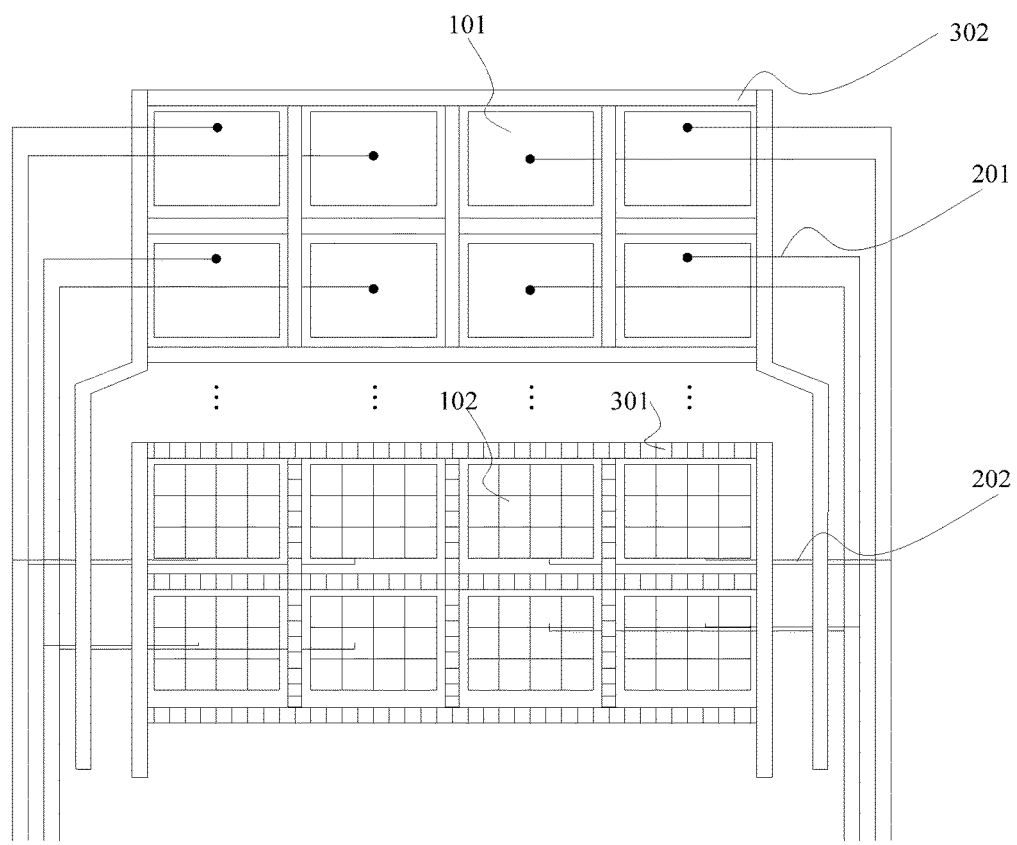
FIG. 4 is another schematic view showing the distribution of the touch electrodes in the touch display panel according to an embodiment of the present disclosure.

Alternatively, as shown in FIGS. 3 and 4, the first touch electrode lines 201 coincide with the second touch electrode lines 202 in a pairwise manner. Here, the first touch electrode lines 201 means the plurality of first touch electrode lines 201 connected to the plurality of first touch electrodes 101, and the second touch electrode lines 202 means the plurality of second touch electrode lines 202 connected to the plurality of second touch electrodes 102.

For example, when there are 50 first touch electrodes, the number of the first touch electrode lines 201 is also 50, and when there are 50 second touch electrodes, the number of the second touch electrode lines 202 is also 50. In this regard, the 50 first touch electrode lines 201 coincide with the 50 second touch electrode lines 202 in a pairwise manner. As a result, it is able to reduce the number of the pads connected to the touch electrode lines by half, and minimize an area of the non-display region occupied by the touch electrode lines.

Alternatively, as shown in FIG. 3, the first touch electrodes 101 are located at a bottom half of the display region of the touch display panel, and the second touch electrodes 102 are located a top half of the display region of the touch display panel.

The region scanning electrodes include bottom half region scanning electrodes 301 arranged on the array substrate and configured to determine whether or not the touch has been made at the bottom half of the display region, and top half region scanning electrodes 302 arranged on the color filter substrate and configured to determine whether or not the touch has been made at the top half of the display region.

Here, the scanning may be performed by the top half region scanning electrodes 302 and the bottom half region scanning electrodes 301 sequentially, and the scanning is performed by each region scanning electrode. For example, when the scanning is performed by the top half region scanning electrodes 302, the second touch electrodes 102 at the top half of the display region may be scanned sequentially through a switching converter. For example, the scanning may be performed in a longitudinally progressive manner or a vertically progressive manner. As a result, the touch position is determined when the touch has been made at the top half of the display region. Identically, for example, when the scanning is performed by the bottom half region scanning electrodes 301, the first touch electrodes 101 at the bottom half of the display region may be scanned sequentially through a switching converter. For example, the scanning may be performed in a longitudinally progressive manner or a vertically progressive manner. As a result, the touch position is determined when the touch has been made at the bottom half of the display region.

It should be appreciated that, firstly, the bottom half of the display region of the touch display panel may be a bottom half of a display region of the array substrate, and the top half of the display region of the touch display panel may be a top half of a display region of the color filter substrate.

In this case, the first touch electrodes 101 and the bottom half region scanning region 301 are arranged at the bottom half of the display region of the array substrate and at different layers, and the second touch electrodes 102 and the top half region scanning electrodes 302 are arranged at the top half of the display region of the color filter substrate and at different layers.

Secondly, in order not to adversely affect the display, the top half region scanning electrodes 302 on the color filter substrate in FIG. 3 is of a grid pattern, i.e., the electrode lines correspond to black matrices.

Alternatively, as shown in FIG. 4, the first touch electrodes 101 are located at the top half of the display region of the touch display panel, and the second touch electrodes 102 are located at the bottom half of the display region of the touch display panel.

The region scanning electrodes further includes top half region scanning electrodes 302 arranged on the array substrate and configured to determine whether or not the touch has been made at the top half of the display region of the touch display panel, and bottom half region scanning electrodes 301 arranged on the color filter substrate and configured to determine whether or not the touch has been made at the bottom half of the display region of the touch display panel.

Here, the scanning may be performed by the top half region scanning electrodes 302 and the bottom half region scanning electrodes 301 sequentially, and the scanning is performed by each region scanning electrode. For example, when the scanning is performed by the top half region scanning electrodes 302, the first touch electrodes 101 at the top half of the display region may be scanned sequentially through a switching converter. For example, the scanning may be performed in a longitudinally progressive manner or a vertically progressive manner. As a result, the touch position is determined when the touch has been made at the top half of the display region. Identically, for example, when the scanning is performed by the bottom half region scanning electrodes 301, the second touch electrodes 102 at the bottom half of the display region may be scanned sequentially through a switching converter. For example, the scanning may be performed in a longitudinally progressive manner or a vertically progressive manner. As a result, the touch position is determined when the touch has been made at the bottom half of the display region.

It should be appreciated that, firstly, the bottom half of the display region of the touch display panel may be a bottom half of a display region of the color filter substrate, and the top half of the display region of the touch display panel may be a top half of a display region of the array substrate.

In this case, the first touch electrodes 101 and the top half region scanning region 302 are arranged at the top half of the display region of the array substrate and at different layers, and the second touch electrodes 102 and the bottom half region scanning electrodes 301 are arranged at the bottom half of the display region of the color filter substrate and at different layers.

Secondly, in order not to adversely affect the display, the bottom half region scanning electrodes 301 on the color filter substrate in FIG. 4 is of a grid pattern, i.e., the electrode lines correspond to black matrices.

Figure 5:
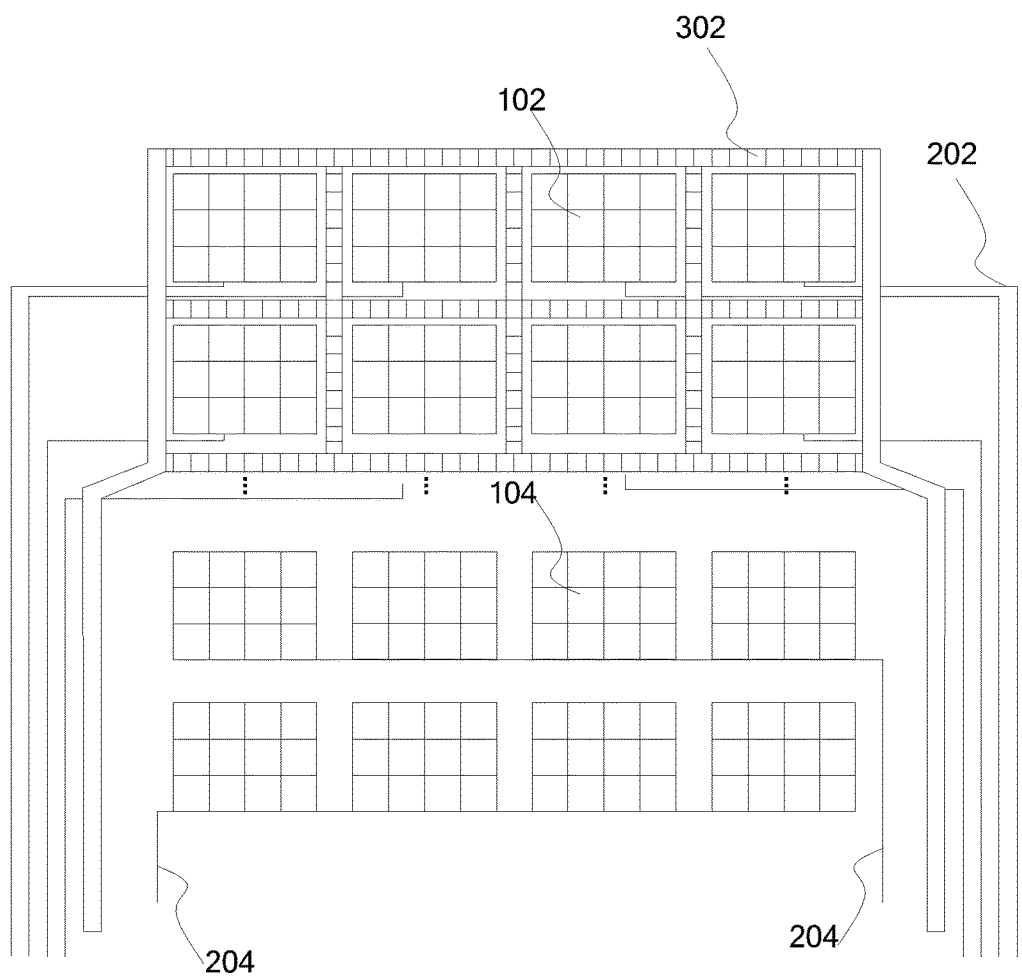
FIG. 5 is a schematic view showing virtual touch electrodes on a color filter substrate according to an embodiment of the present disclosure.

In order to ensure the uniform display, alternatively, as shown in FIG. 5, the touch display panel further includes a plurality of second virtual touch electrodes 104 arranged on the color filter substrate. Each of the second virtual touch electrodes 104 is of a structure identical to each of the second touch electrodes 102, and the second virtual touch electrodes 104 and the second touch electrodes 102 are distributed over the entire display region of the color filter substrate. In other words, when the second touch electrodes 102 are located at the top half of the display region of the color filter substrate, the second virtual touch electrodes 104 are located at the bottom half of the display region of the color filter substrate. Identically, when the second touch electrodes 102 are arranged at the bottom half of the display region of the color filter substrate, the second virtual touch electrode 104 are located at the top half of the display region of the color filter substrate.

The second virtual touch electrodes 104 in each column or each row are electrically connected to each other via a second virtual touch electrode line 204.

Here, a region of the color filter substrate where the second virtual touch electrodes 104 are located is merely used for a display function rather than a touch function.

Figure 6:
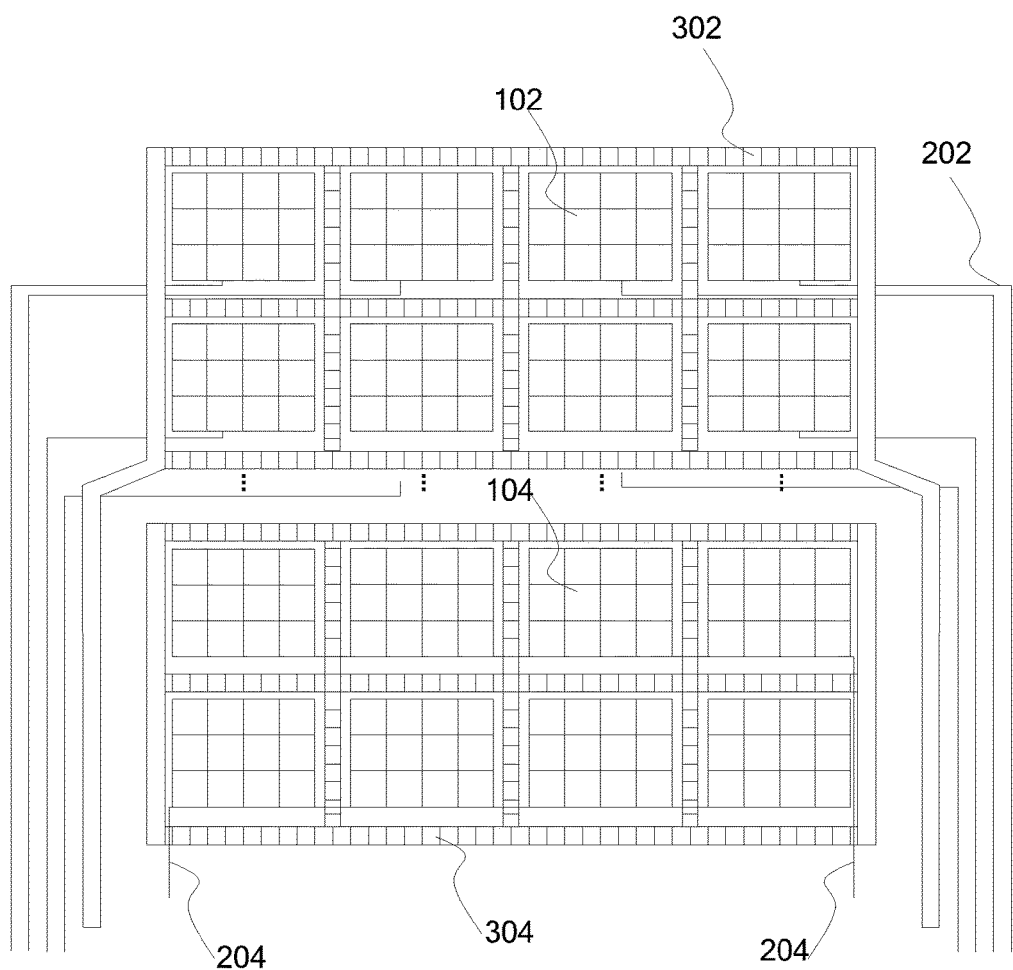
FIG. 6 is another schematic view showing the virtual touch electrodes on the color filter substrate according to an embodiment of the present disclosure.

In order to further ensure the uniform display, as shown in FIG. 6, alternatively, the touch display panel further includes second virtual region scanning electrodes 304 arranged on the color filter substrate and at a region identical to the second virtual touch electrodes 104.

The second virtual region scanning electrodes 304 is of a structure identical to the top half region scanning electrodes 302 or the bottom half region scanning electrodes 301 on the color filter substrate.

Alternatively, the touch display panel further includes first transparent electrodes and second transparent electrodes arranged on the array substrate. The first transparent electrode is electrically connected to the drain electrode of the TFT, and the first touch electrode 101 is a portion of the second transparent electrode.

At a display stage, the first transparent electrode serves as a pixel electrode and the second transparent electrode serves as a common electrode. At a touch stage, as shown in FIG. 7, a portion of the second transparent electrode serves as the first touch electrode 101.

Based upon the above structure, on one hand, an advanced super dimensional switching (ADS) technique may be adopted at the display stage so as to improve the image quality of a product, so as to provide the product with such advantages as high resolution, high light transmittance, low power consumption, wide viewing angle, high aperture ratio, lower chromatic aberration, and being free of Push Mura. On the other hand, the second transparent electrode may be formed by a single patterning process. It may serve as the common electrode at the display stage and may, with a portion thereof, serve as the first touch electrode 101, so it is able to reduce the number of patterning processes, thereby to reduce the production cost.

Figure 7:
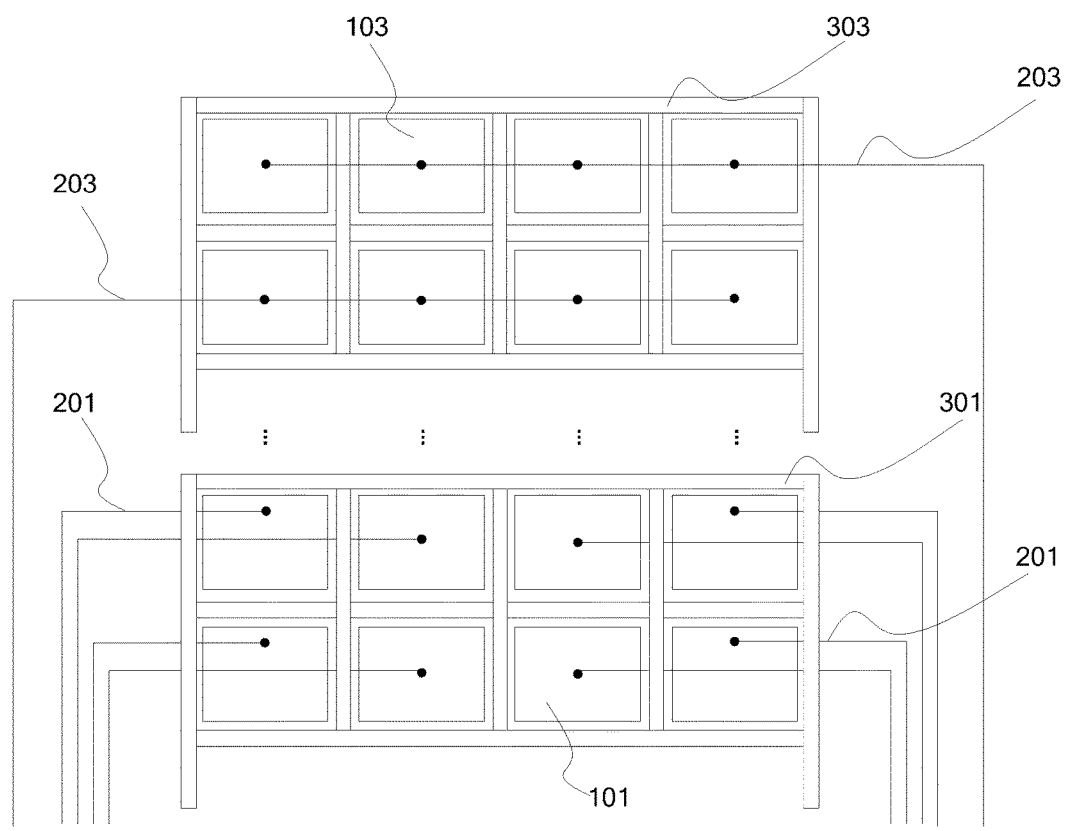
FIG. 7 is a schematic view showing virtual touch electrodes on an array substrate according to an embodiment of the present disclosure.

Based on the above, as shown in FIG. 7, at the touch stage, the remaining portion of the second transparent electrode, other than the portion serving as the first touch electrode 101, may serve as a first virtual touch electrode 103, and the first virtual touch electrodes 103 in each row or column are electrically connected to each other via a first virtual touch electrode line 203, so as to apply a common voltage at the display stage conveniently.

Here, a region of the array substrate where the first virtual touch electrodes 103 are located is merely used for a display function rather than a touch function.

The touch display panel further includes first virtual region scanning electrodes 303 arranged on the array substrate and at a region identical to the first virtual touch electrodes 103. The first virtual region scanning electrode 303 is of a structure identical to the bottom half region scanning electrode 301 or the top half region scanning electrode 302 on the array substrate. As a result, it is able to ensure the uniform display at the display stage.

Here, because at the touch stage a portion of the second transparent electrode is required to serve as the first touch electrode 101 and there is a plurality of first touch electrodes 101, the second transparent electrode consists of a plurality of patterns identical to the patterns of the first touch electrodes 101.

Alternatively, the first touch electrode lines 201 are arranged at a layer identical to the gate electrode of the TFT. The first touch electrode line 201 is connected to the first touch electrode 101 through a via-hole, to form the gate electrode and the first touch electrode line 201 by a single patterning process, thereby to reduce the number of the patterning processes.

Alternatively, the second touch electrodes 102 are arranged at a layer identical to the second touch electrode lines 202.

The second touch electrode line 202 is made of a metal conductive material, so the second touch electrodes 102 and the second touch electrode lines 202 may be arranged at an identical layer, i.e., arranged in a single-layered wiring manner, so as to form them by a single patterning process, thereby to reduce the number of the desired patterning processes.

It should be appreciated that, because the second touch electrode 102 is made of a metal material, it may be of a grid pattern in the embodiments of the present disclosure, so as not to adversely affect the display. In other words, the second touch electrode 102 is divided by a plurality of electrodes corresponding to the black matrix into a plurality of small blocks.

In the embodiments of the present disclosure, because the second touch electrodes 102 on the color filter substrate each are made of a metal material and have a grid pattern, the first touch electrodes 101 on the array substrate may each include transparent block-like electrodes. As a result, when a touch is made by a finger, it is able to determine the touch position in a more accurate manner depending on a contact area between the finger and the touch electrode.

The present disclosure further provides in an embodiment a method for controlling the above-mentioned touch display panel, including steps of, at the touch stage, determining a region where a touch has been made by the region scanning electrode of the touch display panel, and applying a driving signal to the first touch electrode or the second touch electrode at the region where the touch has been made so as to determine a position where the touch has been made.

For example, all the first touch electrodes 101 may be located as a whole at the bottom half of the display region of the touch display panel, and all the second touch electrodes 102 may be located as a whole at the top half of the display region of the touch display panel, when it is determined by the region scanning electrode that the touch has been made at the bottom half of the display region, it is able to determine the touch position through the touch electrodes at the bottom half of the display region, i.e., the first touch electrodes 101. Identically, when it is determined that the touch has been made at the top half of the display region, it is able to determine the touch position through the touch electrodes at the top half of the display region, i.e., the second touch electrodes 102.

To be specific, one of the at least parts of the first touch electrode lines 201 coincides with one of the at least parts of the second touch electrode lines 202 at the non-display region, i.e., a voltage is applied by the driver IC via a pad, e.g., Pad1, to the first touch electrode line 201 and the second touch electrode line 202 that coincide with each other. When it is determined by the region scanning electrode that the touch has been made at the bottom half of the display region, the voltage is merely applied by the driver IC to the first touch electrode 101 at the bottom half of the display region, so it is able to determine the touch position at the bottom half of the display region.

Identically, one of the at least parts of the first touch electrode lines 201 coincides with one of the at least parts of the second touch electrode lines 202 at the non-display region, i.e., a voltage is applied by the driver IC via a pad, e.g., Pad1, to the first touch electrode line 201 and the second touch electrode line 202 that coincide with each other. When it is determined by the region scanning electrode that the touch has been made at the top half of the display region, the voltage is merely applied by the driver IC to the second touch electrode 102 at the top half of the display region, so it is able to determine the touch position at the top half of the display region.

Alternatively, the top half region scanning electrodes 302 and the bottom half region scanning electrodes 301 may be used to determine whether the touch has been made at the top half or bottom half of the display region of the touch display panel.

Figure 8:
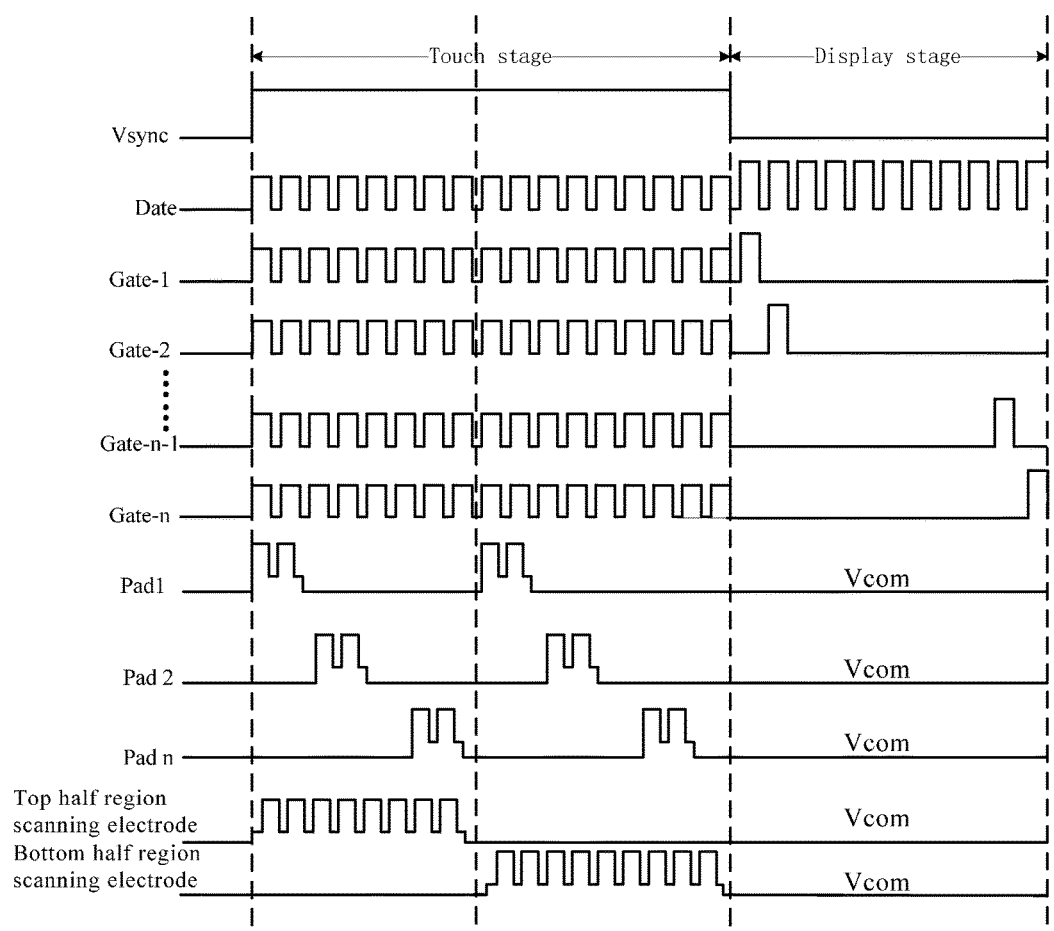
FIG. 8 is a sequence diagram of the touch display panel for an image display function and a touch function according to an embodiment of the present disclosure.

To be specific, as shown in FIG. 8, the scanning is performed by the top half region scanning electrodes 302 and the bottom half region scanning electrodes 301 sequentially. When the scanning is performed by each region scanning electrode, e.g., the top half region scanning electrodes 302, a driving signal may be applied by a switching converter to Pad1, Pad2, . . . , Padn sequentially, so as to scan the touch electrodes at the top half of the display region, thereby to determine the touch position when the touch has been made at the top half of the display region. Identically, when the scanning is performed by the bottom half region scanning electrodes 301, the driving signal may be applied by the switching converter to Pad1, Pad2, . . . , Padn sequentially, so as to scan the touch electrodes at the bottom half of the display region, thereby to determine the touch position when the touch has been made at the bottom half of the display region.

It should be appreciated that, as shown in FIG. 8, when the first touch electrode 01 on the array substrate is a portion of the second transparent electrode, Vcom is applied to all the electrodes at the display stage, so as to ensure normal display. In addition, at the touch stage, a voltage applied to the gate electrode of the TFT and a voltage applied by a data line to the source electrode need to be equal to the voltage applied to the touch electrode, so as to eliminate an influence of the touch electrodes on a gate-to-source capacitance.

FIG. 8 shows the situation where all the first touch electrode lines 201 coincide with all the second touch electrode lines 202 in a pairwise manner. However, the present disclosure is not limited thereto, e.g., parts of the first touch electrode lines 201 may coincide with parts of the second touch electrode lines 202 in a pairwise manner, which will not be particularly defined herein.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A touch display panel, comprising:
   a plurality of first touch electrodes and a plurality of first touch electrode lines arranged on an array substrate, a plurality of second touch electrodes and a plurality of second touch electrode lines arranged on a color filter substrate, and region scanning electrodes,
   wherein each of the plurality of first touch electrode lines is connected to each of the plurality of first touch electrodes, and each of the plurality of second touch electrode lines is connected to each of the plurality of second touch electrodes;
   the plurality of first touch electrodes are located at one half of a display region of the touch display panel, and the plurality of second touch electrodes are located at the other half of the display region of the display panel;
   at a non-display region, at least parts of the plurality of first touch electrode lines coincide with at least parts of the plurality of second touch electrode lines in a pairwise manner; and
   the region scanning electrodes are configured to determine a region where a touch has been made.

2. The touch display panel according to claim 1, wherein the plurality of first touch electrode lines completely coincide with the plurality of second touch electrode lines in a one-to-one correspondence.

3. The touch display panel according to claim 1, wherein the plurality of first touch electrodes are located at a bottom half of the display region of the touch display panel, and the plurality of second touch electrodes are located at a top half of the display region of the touch display panel; and the region scanning electrodes comprise bottom half region scanning electrodes arranged on the array substrate and configured to determine whether or not the touch has been made at the bottom half of the display region of the touch display panel, and top half region scanning electrodes arranged on the color filter substrate and configured to determine whether or not the touch has been made at the top half of the display region of the touch display panel.

4. The touch display panel according to claim 1, wherein the plurality of first touch electrodes are located at a top half of the display region of the touch display panel, and the plurality of second touch electrodes are located at a bottom half of the display region of the touch display panel; and the region scanning electrodes further comprise top half region scanning electrodes arranged on the array substrate and configured to determine whether or not the touch has been made at the top half of the display region of the touch display panel, and bottom half region scanning electrodes arranged on the color filter substrate and configured to determine whether or not the touch has been made at the bottom half of the display region of the touch display panel.

5. The touch display panel according to claim 3, further comprising a plurality of second virtual touch electrodes arranged on the color filter substrate, wherein each of the plurality of second virtual touch electrodes is of a structure identical to each of the plurality of second touch electrodes, and the plurality of second virtual touch electrodes and the plurality of second touch electrodes are distributed over an entire display region of the color filter substrate; and wherein the plurality of second virtual touch electrodes in each row or column are electrically connected to each other via a second virtual touch electrode line.

6. The touch display panel according to claim 4, further comprising a plurality of second virtual touch electrodes arranged on the color filter substrate, wherein each of the plurality of second virtual touch electrodes is of a structure identical to each of the second touch electrodes, and the plurality of second virtual touch electrodes and the plurality of second touch electrodes are distributed over an entire display region of the color filter substrate; and wherein the plurality of second virtual touch electrodes in each row or column are electrically connected to each other via a second virtual touch electrode line.

7. The touch display panel according to claim 5, further comprising second virtual region scanning electrodes arranged on the color filter substrate and at a region identical to the plurality of second virtual touch electrodes, wherein the second virtual region scanning electrodes are of a structure identical to the top half region scanning electrodes or the bottom half region scanning electrodes on the color filter substrate.

8. The touch display panel according to claim 6, further comprising second virtual region scanning electrodes arranged on the color filter substrate and at a region identical to the plurality of second virtual touch electrodes, wherein the second virtual region scanning electrodes are of a structure identical to the top half region scanning electrodes or the bottom half region scanning electrodes on the color filter substrate.

9. The touch display panel according to claim 1, further comprising first transparent electrodes and second transparent electrodes arranged on the array substrate, wherein the first transparent electrode is electrically connected to a drain electrode of a thin film transistor, and the first touch electrode is a portion of the second transparent electrode.

10. The touch display panel according to claim 9, wherein the remaining portions of the second transparent electrode, other than the portion serving as the first touch electrode, are electrically connected to each other in each row or column via a first virtual touch electrode line, the touch display panel further comprises first virtual region scanning electrodes arranged on the array substrate and at a region identical to the remaining portions of the second transparent electrode, wherein the first virtual region scanning electrode is of a structure identical to the bottom half region scanning electrode or the top half region scanning electrode on the array substrate.

11. The touch display panel according to claim 9, wherein the plurality of first touch electrode lines are arranged at a layer identical to a gate electrode of the thin film transistor.

12. The touch display panel according to claim 1, wherein the plurality of second touch electrodes are arranged at a layer identical to the plurality of second touch electrode lines.

13. A method for controlling the touch display panel according to claim 1, comprising steps of:

at a touch stage, determining a region where a touch has been made by region scanning electrodes of the touch display panel; and applying a driving signal to first touch electrodes or second touch electrodes at the region where the touch has been made so as to determine a position where the touch has been made.

14. A method for controlling the touch display panel according to claim 2, comprising steps of:

at a touch stage, determining a region where a touch has been made by region scanning electrodes of the touch display panel; and applying a driving signal to first touch electrodes or second touch electrodes at the region where the touch has been made so as to determine a position where the touch has been made.

15. A method for controlling the touch display panel according to claim 3, comprising steps of:

at a touch stage, determining a region where a touch has been made by region scanning electrodes of the touch display panel; and applying a driving signal to first touch electrodes or second touch electrodes at the region where the touch has been made so as to determine a position where the touch has been made.

16. A method for controlling the touch display panel according to claim 4, comprising steps of:

at a touch stage, determining a region where a touch has been made by region scanning electrodes of the touch display panel; and applying a driving signal to first touch electrodes or second touch electrodes at the region where the touch has been made so as to determine a position where the touch has been made.

17. A method for controlling the touch display panel according to claim 5, comprising steps of:

at a touch stage, determining a region where a touch has been made by region scanning electrodes of the touch display panel; and applying a driving signal to first touch electrodes or second touch electrodes at the region where the touch has been made so as to determine a position where the touch has been made.

18. A method for controlling the touch display panel according to claim 6, comprising steps of:

at a touch stage, determining a region where a touch has been made by region scanning electrodes of the touch display panel; and applying a driving signal to first touch electrodes or second touch electrodes at the region where the touch has been made so as to determine a position where the touch has been made.

19. A method for controlling the touch display panel according to claim 7, comprising steps of:

at a touch stage, determining a region where a touch has been made by region scanning electrodes of the touch display panel; and applying a driving signal to first touch electrodes or second touch electrodes at the region where the touch has been made so as to determine a position where the touch has been made.

20. The method according to claim 13, wherein the step of determining the region where the touch has been made by the region scanning electrode of the touch display panel comprises:

determining whether the touch has been made at a top half or a bottom half of a display region of the touch display panel by top half region scanning electrodes and bottom half region scanning electrodes of the touch display panel.

* * * * *